US012594900B2

(12) United States Patent　(10) Patent No.:　US 12,594,900 B2
Ono　(45) Date of Patent:　Apr. 7, 2026

(54) STRUCTURAL MEMBER

(71) Applicant: NIPPON STEEL CORPORATION, Tokyo (JP)

(72) Inventor: Atsushi Ono, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 377 days.

(21) Appl. No.: 18/269,786

(22) PCT Filed: Dec. 24, 2021

(86) PCT No.: PCT/JP2021/048389

§ 371 (c)(1),
(2) Date: Jun. 27, 2023

(87) PCT Pub. No.: WO2022/149504

PCT Pub. Date: Jul. 14, 2022

(65) Prior Publication Data

US 2024/0059237 A1　Feb. 22, 2024

(30) Foreign Application Priority Data

Jan. 7, 2021　(JP) ................................. 2021-001211

(51) Int. Cl.
B60R 19/04　(2006.01)
B60R 19/02　(2006.01)
B60R 19/18　(2006.01)

(52) U.S. Cl.
CPC ............ B60R 19/04 (2013.01); B60R 19/023 (2013.01); B60R 19/18 (2013.01)

(58) Field of Classification Search
CPC ....... B60R 19/023; B60R 19/18; B60R 19/04; B60R 2019/1813
See application file for complete search history.

(56) References Cited

U.S. PATENT DOCUMENTS

| | | | |
|---|---|---|---|
| 6,371,540 B1 * | 4/2002 | Campanella | ............ B60R 19/18 293/121 |
| 2016/0200371 A1 | 7/2016 | Inamoto | |
| 2020/0164819 A1 * | 5/2020 | Koga | ...................... B60R 19/18 |

FOREIGN PATENT DOCUMENTS

| | | |
|---|---|---|
| JP | 2006-240134 A | 9/2006 |
| JP | 2015-67090 A | 4/2015 |
| JP | 2016-88206 A | 5/2016 |
| JP | 6485606 B1 | 3/2019 |

* cited by examiner

*Primary Examiner* — Caroline N Butcher

(74) *Attorney, Agent, or Firm* — Birch, Stewart, Kolasch & Birch, LLP

(57) ABSTRACT

A structural member includes a first member, a second member, and a restricting portion. The first member includes a top plate, vertical walls, flanges, and ridge portions. The second member includes a top plate, vertical walls, flanges, and ridge portions. The vertical walls of the second member are disposed along the vertical walls of the first member inside of the vertical walls. The flanges of the second member are joined to the flanges of the first member, respectively. The restricting portion is provided between the vertical walls of the second member. The restricting portion restricts deformation in which portions of the vertical walls of the first member close to the flanges approach each other.

12 Claims, 12 Drawing Sheets

STRUCTURAL MEMBER

TECHNICAL FIELD

The present disclosure relates to a structural member, and more particularly to a structural member for a mobile body having an elongated shape.

BACKGROUND ART

Whereas a structural member used for a mobile body, such as an automobile, is required to have a reduced weight from a viewpoint of increasing fuel efficiency, for example, the structural member is also required to have crash resistance. For example, the bumper reinforcement of an automobile, which is one kind of the structural member, is installed at the front portion or the rear portion of a vehicle body, and absorbs impact by bending deformation when the bumper reinforcement receives a crash load from the front side or the rear side of the vehicle body. The bumper reinforcement is required to bear a large load with a small amount of deformation.

Patent Literature 1 proposes a bumper reinforcement having a shape that suppresses deformation at the time of a crash. The bumper reinforcement disclosed in Patent Literature 1 includes a first member and a second member. The first member has a hat-shaped transverse cross section. The second member is a closing plate that closes an opening of the first member. Each of the first member and the second member includes a top plate, two vertical walls, and two flanges. The vertical walls of the second member are disposed to face the vertical walls of the first member inside of the first member. The top plate of the second member includes a protruding portion that protrudes in the direction opposite to the top plate of the first member.

According to Patent Literature 1, when a crash load is input to the bumper reinforcement from the direction of the second member, thus causing bending deformation in the bumper reinforcement, of the respective vertical walls of the first member, end portions close to the second member move toward the center of the bumper reinforcement in the vehicle height direction. That is, in the first member, deformation occurs in which both vertical walls tilt inward. However, in the bumper reinforcement disclosed in Patent Literature 1, when bending deformation occurs, of the top plate of the second member, portions other than the protruding portion move toward both vertical walls of the first member and hence, it is possible to suppress tilting of both vertical walls of the first member.

CITATION LIST

Patent Literature

Patent Literature 1: Japanese Patent No. 6485606

SUMMARY OF INVENTION

Technical Problem

As described in Patent Literature 1, when a crash load is input to the bumper reinforcement from the direction of the second member, which is the closing plate, the first member deforms such that both vertical walls tilt inward. When such deformation further progresses, cross-sectional collapse (plastic deformation) of the bumper reinforcement occurs, so that the withstand load of the bumper reinforcement decreases considerably.

In the structural member, such as the bumper reinforcement, that absorbs impact at the time of a crash, the magnitude of the withstand load depends on the product of the height in transverse cross section (the length in the direction in which a load is input) and stress generated in each region. Therefore, in the case in which the height of the structural member in transverse cross section reduces at an early stage of a crash, the structural member cannot receive a crash load at an initial stage of the crash, and the structural member is liable to plastically deform. The structural member is required to suppress a reduction in height in transverse cross section at the time of a crash and to increase withstand load performance.

An objective of the present disclosure is to provide a structural member for a mobile body being capable of increasing withstand load performance.

Solution to Problem

A structural member according to the present disclosure is a structural member for a mobile body, and has an elongated shape. The structural member includes a first member, a second member, and a restricting portion. Each of the first member and the second member extends in a longitudinal direction of the structural member. The first member includes a first top plate, a pair of first vertical walls, a pair of first flanges, and a pair of first ridge portions. The first vertical walls are disposed to face each other, and end edges of the first vertical walls are connected by the first top plate. The first flanges are disposed opposite to the first top plate with respect to the first vertical walls, and protrude outward relative to the first vertical walls. The first ridge portions connect the first vertical walls and the first flanges. The second member includes a second top plate, a pair of second vertical walls, a pair of second flanges, and a pair of second ridge portions. The second top plate is disposed inside of the first vertical walls, and faces the first top plate with a space between the second top plate and the first top plate. The second vertical walls are disposed along the first vertical walls inside of the first vertical walls, and end edges of the second vertical walls are connected to each other by the second top plate. The second flanges are disposed opposite to the second top plate with respect to the second vertical walls, and protrude outward relative to the second vertical walls. The second flanges are joined to the first flanges. The second ridge portions connect the second vertical walls and the second flanges. The restricting portion is provided between the second vertical walls. The restricting portion restricts deformation in which portions of the first vertical walls close to the first flanges approach each other.

Advantageous Effect of Invention

According to the structural member for a mobile body according to the present disclosure, it is possible to increase withstand load performance.

DESCRIPTION OF EMBODIMENTS

Figure 1:
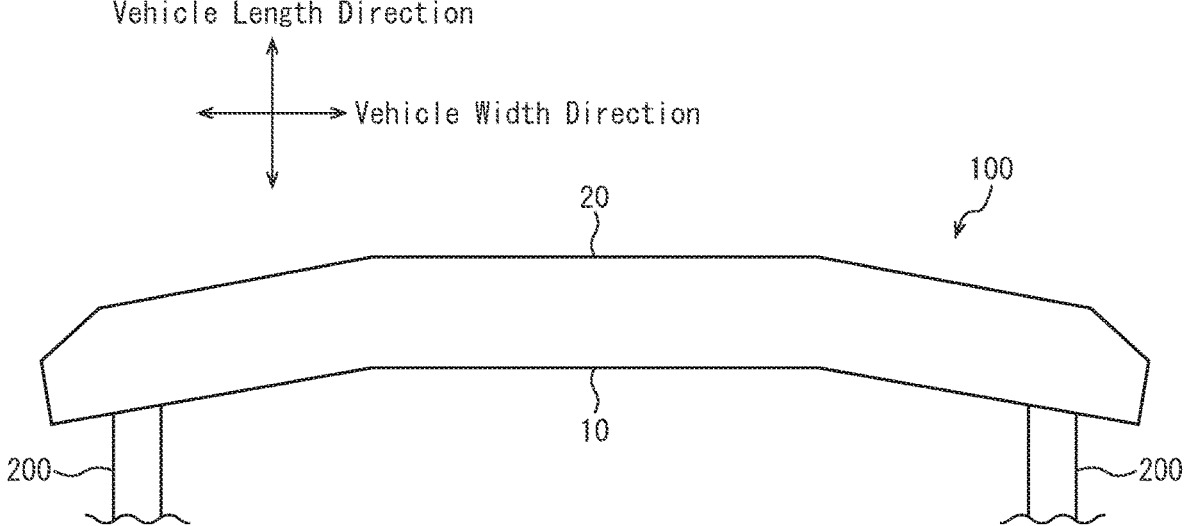
FIG. 1 is a schematic view of a structural member according to a first embodiment.

A structural member according to an embodiment is a structural member for a mobile body, and has an elongated shape. The structural member includes a first member, a second member, and a restricting portion. Each of the first member and the second member extends in a longitudinal direction of the structural member. The first member includes a first top plate, a pair of first vertical walls, a pair of first flanges, and a pair of first ridge portions. The first vertical walls are disposed to face each other, and end edges of the first vertical walls are connected to each other by the first top plate. The first flanges are disposed opposite to the first top plate with respect to the first vertical walls, and protrude outward relative to the first vertical walls. The first ridge portions connect the first vertical walls and the first flanges. The second member includes a second top plate, a pair of second vertical walls, a pair of second flanges, and a pair of second ridge portions. The second top plate is disposed inside of the first vertical walls, and faces the first top plate with a space between the second top plate and the first top plate. The second vertical walls are disposed along the first vertical walls inside of the first vertical walls, and end edges of the second vertical walls are connected to each other by the second top plate. The second flanges are disposed opposite to the second top plate with respect to the second vertical walls, and protrude outward relative to the second vertical walls. The second flanges are joined to the first flanges. The second ridge portions connect the second vertical walls and the second flanges. The restricting portion is provided between the second vertical walls. The restricting portion restricts deformation in which portions of the first vertical walls close to the first flanges approach each other (first configuration).

In the structural member according to the first configuration, the second vertical walls of the second member are disposed along the first vertical walls of the first member inside of the first vertical walls. Further, the restricting portion is provided between the second vertical walls, the restricting portion restricting deformation in which the portions of the first vertical walls close to the first flanges approach each other, that is, deformation in which the respective first vertical walls tilt toward the inside of the first member. Therefore, when a crash load is input to the structural member from the direction of the second member, so that the first vertical walls tend to tilt toward the inside of the first member, it is possible to suppress tilting of the first vertical walls by the second vertical walls and the restricting portion. Accordingly, at the time of a crash of the mobile body, a reduction in height of the structural member in transverse cross section is suppressed, and the structural member can receive a crash load at a stage in which the amount of intrusion into the structural member is small. As a result, it is possible to increase withstand load performance of the structural member against a crash load from the direction of the second member.

It is preferable that a size of each gap formed between the first vertical walls and the second vertical walls be 2.0 mm or less (second configuration).

According to the second configuration, the second vertical walls of the second member are disposed sufficiently proximate to the first vertical walls of the first member. Therefore, it is possible to more effectively suppress tilting of the first vertical walls toward the inside of the first member. Accordingly, it is possible to further increase withstand load performance of the structural member against a crash load from the direction of the second member.

The restricting portion may be formed of a plurality of beads. Each of the plurality of beads protrudes from the second top plate in a direction opposite to the first top plate. Each of the plurality of beads extends from one second vertical wall to the other second vertical wall to be connected to the second vertical walls (third configuration).

According to the third configuration, the plurality of beads are provided between the second vertical walls of the second member as the restricting portion that restricts tilting of the first vertical walls of the first member. The plurality of beads can disperse a crash load in the longitudinal direction of the structural member. Therefore, plastic deformation of the structural member is less likely to occur and hence, it is possible to maintain the withstand load of the structural member even when the amount of intrusion into the structural member increases. Accordingly, it is possible to further increase withstand load performance of the structural member against a crash load from the direction of the second member.

It is preferable that, in a direction perpendicular to both the longitudinal direction of the structural member and a direction in which the first vertical walls face each other, a height of each of the plurality of beads be 50% or less of a height of the second vertical walls (fourth configuration).

In the fourth configuration, in the direction perpendicular to the longitudinal direction of the structural member and the direction in which the first vertical walls of the first member face each other, the ratio of the height of each bead to the height of the second vertical walls is set to 50% or less. With such a configuration, when a crash load is input to the structural member from the direction of the second member, plastic deformation of the structural member is even less likely to occur and hence, it is possible to maintain the withstand load of the structural member for a longer period of time. Accordingly, it is possible to further increase withstand load performance of the structural member against a crash load from the direction of the second member.

It is preferable that, among the plurality of beads, an interval between adjacent beads in the longitudinal direction of the structural member be less than 45.0 mm (fifth configuration).

In the fifth configuration, the interval between the beads in the longitudinal direction of the structural member is set to less than 45.0 mm. With such a configuration, when a crash load is input to the structural member from the direction of the second member, plastic deformation of the structural member can be effectively suppressed and hence, it is possible to maintain the withstand load of the structural member for a longer period of time. Accordingly, it is possible to further increase withstand load performance of the structural member against a crash load from the direction of the second member.

At least some of the plurality of beads may contiguously extend from the one second vertical wall to the other second vertical wall (sixth configuration). Alternatively, all of the plurality of beads may contiguously extend from the one second vertical wall to the other second vertical wall (seventh configuration).

In the sixth or seventh configuration, some or all of the beads contiguously extend from one second vertical wall to the other second vertical wall of the second member. With such a configuration, when a crash load is input to the structural member from the direction of the second top plate, it is possible to further surely suppress tilting of the first vertical walls of the first member. Accordingly, it is possible to further increase withstand load performance of the structural member against a crash load from the direction of the second member.

The plurality of beads may be arranged at a uniform interval over an overall length of the second member (eighth configuration).

In the structural member according to the eighth configuration, the plurality of beads are uniformly arranged over the overall length of the second member. In this case, irrespective of the portion to which a crash load is input, it is possible to cause the structural member to exhibit the effect on withstand load performance brought about by the beads.

The plurality of beads may be arranged in a non-uniform manner over the overall length of the second member (ninth configuration).

In the structural member according to the ninth configuration, the plurality of beads are arranged in a non-uniform manner over the overall length of the second member. That is, over the overall length of the second member, there are a portion in which the density of the beads is relatively high and a portion in which the density of the beads is relatively low. In this case, when a crash load is input to the structural member, it is possible to cause a portion of the structural member in which the density of the beads is low to deform prior to other portions.

Each of the plurality of beads may have a curved shape that protrudes in a direction opposite to the first top plate as viewed in a longitudinal cross-sectional view of the structural member (tenth configuration). Each of the plurality of beads may have a corner portion formed by linear-shaped portions disposed adjacent to as viewed in a longitudinal cross-sectional view of the structural member (eleventh configuration).

In the above-mentioned structural member, the restricting portion may be integrally formed with the second member (twelfth configuration). In this case, it is possible to suppress an increase in the weight of the structural member caused by the restricting portion.

The restricting portion may be included in a member that is formed separately from the second member (thirteenth configuration). With such a configuration, the shape of the second member is simplified and hence, it is possible to easily form the second member.

Hereinafter, embodiments of the present disclosure will be described with reference to drawings. In respective drawings, identical or corresponding components are given the same reference symbols, and the same description will not be repeated.

First Embodiment

Overall Configuration

FIG. 1 is a schematic view of a structural member 100 for a mobile body according to the present embodiment. Although not particularly limited, an example of the mobile body includes an automobile. The structural member 100 is used as a member that forms the vehicle body of the automobile, for example. The structural member 100 may be a bumper reinforcement. In the present embodiment, the description will be made for an example in which the structural member 100 is a bumper reinforcement.

As shown in FIG. 1, the structural member 100 has an elongated shape. The structural member 100 is installed at the front portion or the rear portion of the vehicle body, and extends in substantially a vehicle width direction. In the example shown in FIG. 1, the structural member 100 bends to protrude toward the outside of the vehicle body in vehicle length direction.

The structural member 100 includes a first member 10 and a second member 20. Each of the first member 10 and the second member 20 extends in the longitudinal direction of the structural member 100. That is, each of the first member 10 and the second member 20 extends in the vehicle width direction. The length of the first member 10 is substantially equal to the length of the second member 20, for example. However, there may be a slight difference between the length of the first member 10 and the length of the second member 20.

The second member 20 is disposed on the outer side of the vehicle body relative to the first member 10. In the case in which the structural member 100 is a bumper reinforcement that is installed at the front portion of the vehicle body, the second member 20 is disposed forward of the first member 10. In the case in which the structural member 100 is a bumper reinforcement that is installed at the rear portion of the vehicle body, the second member 20 is disposed rearward of the first member 10. Both end portions of the first member 10 in the vehicle width direction are supported by crash boxes 200, for example.

[Detailed Configuration]

Figure 2:
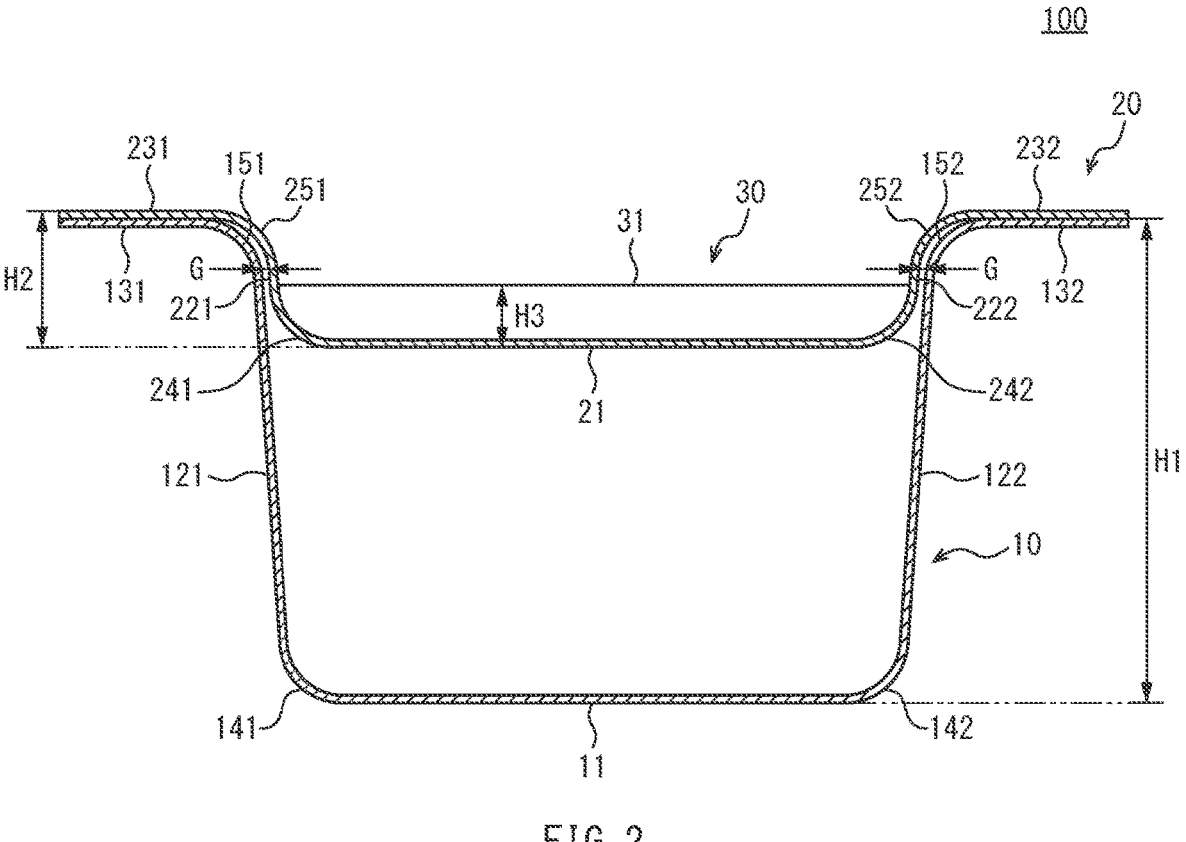
FIG. 2 is a transverse cross-sectional view of the structural member according to the first embodiment.
Figure 3:
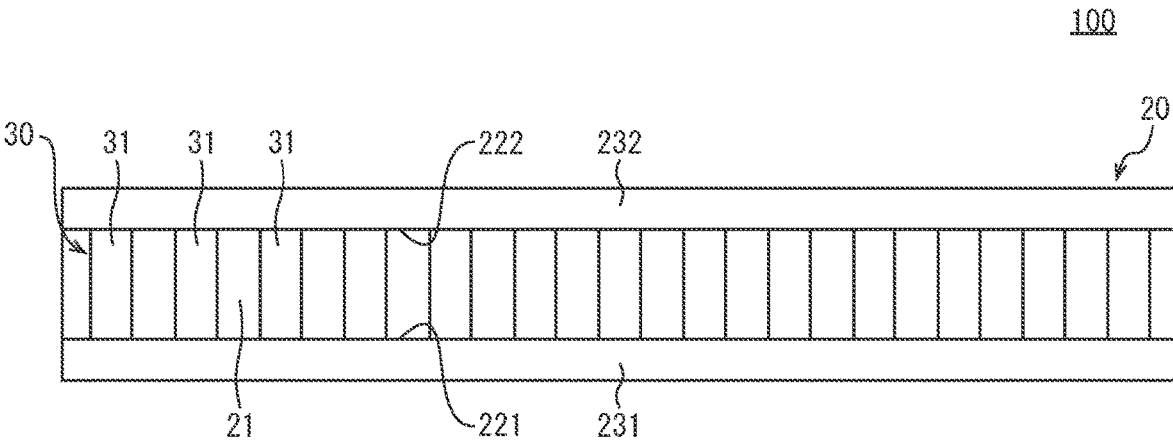
FIG. 3 is a plan view of the structural member shown in FIG. 2.
Figure 4:
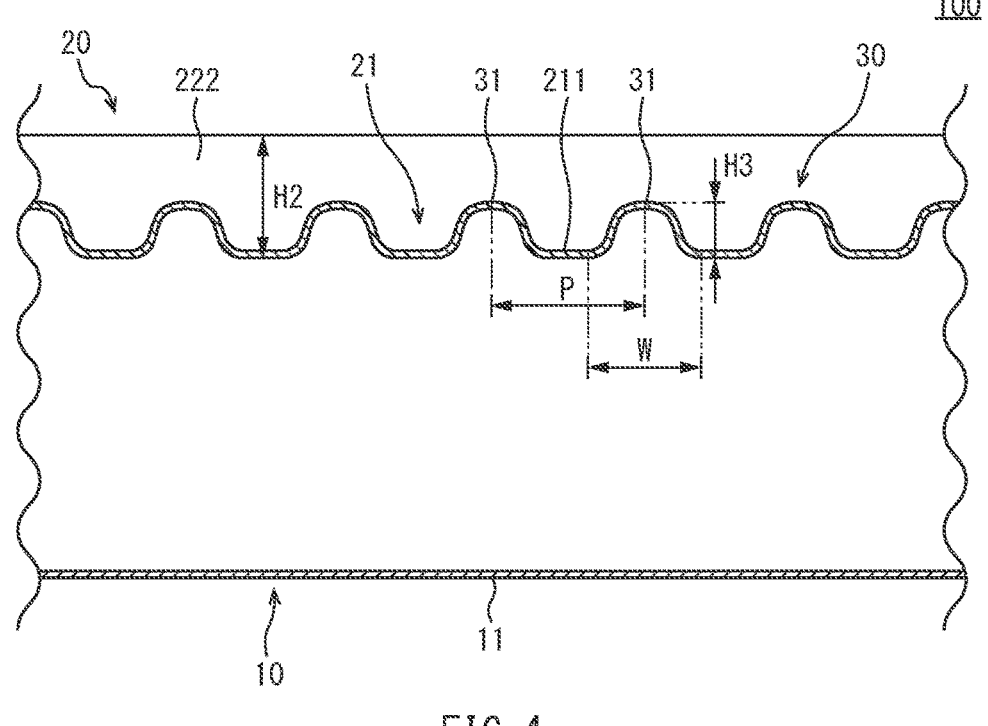
FIG. 4 is a partial longitudinal cross-sectional view of the structural member shown in FIG. 2.

Next, the configuration of the structural member 100 will be described in more detail with reference to FIG. 2 to FIG. 4. FIG. 2 is a transverse cross-sectional view of the structural member 100. FIG. 3 is a diagram (plan view) of the structural member 100 as viewed from the direction of the second member 20. FIG. 4 is a partial longitudinal cross-sectional view of the structural member 100. The transverse cross section of the structural member 100 is a cross section of the structural member 100 taken along a plane substantially perpendicular to the longitudinal direction of the structural member 100. The longitudinal cross section of the structural member 100 is a cross section of the structural member 100 taken along a plane substantially parallel to the longitudinal direction of the structural member 100. Hereinafter, there may be a case in which the configuration of the structural member 100 is described by referring to the up and down direction on the paper on which FIG. 2 is drawn as the up and down direction or the height direction of the structural member 100 and by referring to the direction orthogonal to the up and down direction on the paper on which FIG. 2 is drawn as the width direction. The up and down direction and the width direction substantially match the vehicle length direction and the vehicle height direction, respectively of the vehicle body on which the structural member 100 is installed.

(First Member)

Referring to FIG. 2, the first member 10 has a substantially-hat-shaped transverse cross section. The first member 10 includes a top plate 11, a pair of vertical walls 121, 122, and a pair of flanges 131, 132. The first member 10 further includes a pair of ridge portions 141, 142 and a pair of ridge portions 151, 152.

The top plate 11 is the portion of the structural member 100 that is disposed at the innermost portion of the vehicle body. The end edges of the vertical walls 121, 122 are connected to each other by the top plate 11. The vertical walls 121, 122 protrude upward from the top plate 11. In the example shown in FIG. 2, the vertical walls 121, 122 are disposed to slightly tilt with respect to the up and down direction (the vehicle length direction). However, the vertical walls 121, 122 may be disposed to be substantially parallel to the up and down direction.

The vertical walls 121, 122 face each other. That is, the vertical walls 121, 122 are disposed such that one surface of the vertical wall 121 faces one surface of the vertical wall 122 in the width direction of the structural member 100. The ridge portion 141 connects the top plate 11 to the vertical wall 121, and the ridge portion 142 connects the top plate 11 to the vertical wall 122. One vertical wall 121 is connected to the top plate 11 via the ridge portion 141. The other vertical wall 122 is connected to the top plate 11 via the ridge portion 142 opposite to the vertical wall 121. Each of the ridge portions 141, 142 has a substantially arc shape as viewed in a transverse cross-sectional view of the structural member 100, for example.

The flanges 131, 132 are disposed opposite to the top plate 11 with respect to the vertical walls 121, 122, and protrude outward relative to the vertical walls 121, 122. The flanges 131, 132 protrude outward in the width direction from the vertical walls 121, 122 facing each other. The flanges 131, 132 are connected to the end edges of the vertical walls 121, 122 opposite to the end edges of the vertical walls 121, 122 that are connected to each other by the top plate 11. One flange 131 is connected to one vertical wall 121 via the ridge portion 151. The other flange 132 is connected to the other vertical wall 122 via the ridge portion 152. That is, the vertical wall 121 and the flange 131 are connected by the ridge portions 151, 152, and the vertical wall 122 and the flange 132 are connected by the ridge portion 152. The vertical wall 121 and the flange 131 may be formed as an integral body, or may be formed as separate bodies and then joined together by welding or the like. In the same manner, the vertical wall 122 and the flange 132 may be formed as an integral body, or may be formed as separate bodies and then joined together by welding or the like. Each of the ridge portions 151, 152 has a substantially arc shape as viewed in a transverse cross-sectional view of the structural member 100, for example.

The first member 10 is made of a plate-like starting material. A material of the first member 10 is metal, such as steel or aluminum, for example. The first member 10 is typically formed by pressing a metal sheet. However, the material of the first member 10 is not limited to metal. For example, carbon fiber reinforced plastic (CFRP) or the like may be selected as a material of the first member 10.

(Second Member)

The second member 20 closes an opening of the first member 10 having a substantially-hat-shaped transverse cross section, thus forming a closed cross section in conjunction with the first member 10. The second member 20 includes a top plate 21, a pair of vertical walls 221, 222, and a pair of flanges 231, 232. The second member 20 further includes a pair of ridge portions 241, 242 and a pair of ridge portions 251, 252.

The top plate 21 is disposed inward of the vertical walls 121, 122 of the first member 10. That is, the top plate 21 is disposed between the vertical wall 121 and the vertical wall 122. The top plate 21 is disposed upward of the top plate 11 of the first member 10. The top plate 21 faces the top plate 11 with a space therebetween. The top plate 21 is spaced apart from the top plate 11 to prevent contact of the top plate 21 with the top plate 11 even when deformation occurs in the structural member 100 due to a crash load.

The vertical walls 221, 222 are disposed inward of the vertical walls 121, 122 of the first member 10. The end edges of the vertical walls 221, 222 are connected to each other by the top plate 21. The vertical walls 221, 222 protrude upward from the top plate 21.

The vertical walls 221, 222 face each other. That is, the vertical walls 221, 222 are disposed such that one surface of the vertical wall 221 faces one surface of the vertical wall 222 in the width direction of the structural member 100. The ridge portion 241 connects the vertical wall 221 to the top plate 21, and the ridge portion 242 connects the vertical wall 222 to the top plate 21. One vertical wall 221 is connected to the top plate 21 via the ridge portion 241. The other vertical wall 222 is connected to the top plate 21 via the ridge portion 242 opposite to the vertical wall 221. Each of the ridge portions 241, 242 has a substantially arc shape as viewed in a transverse cross-sectional view of the structural member 100, for example.

The vertical walls 221, 222 are respectively disposed along the vertical walls 121, 122 of the first member 10 inside of the vertical walls 121, 122. The one vertical wall 221 is proximate to the one vertical wall 121 of the first member 10. The other vertical wall 222 is proximate to the other vertical wall 122 of the first member 10. The size of a gap G formed between the vertical wall 121 of the first member 10 and the vertical wall 221 of the second member 20 and the size of a gap G formed between the vertical wall 122 of the first member 10 and the vertical wall 222 of the second member 20 are preferably set to 2.0 mm or less. Each gap G is more preferably 0 mm. That is, it is preferable that the vertical walls 221, 222 be respectively in contact with the vertical walls 121, 122. In the case in which the gap G is 0 mm, the vertical walls 221, 222 may be respectively joined to the vertical walls 121, 122 by welding or the like, for example.

A vertical wall height H2 of the second member 20 is smaller than a vertical wall height H1 of the first member 10. The vertical wall height H2 is the height of the vertical walls 221, 222 in the direction substantially perpendicular to both the longitudinal direction of the structural member 100 and the direction in which the vertical walls 121, 122 of the first member 10 face each other. The height of the vertical walls 221, 222 is a length obtained by combining the length of the vertical walls 221, 222 itself in the up and down direction, the length of the ridge portions 241, 242 in the up and down direction, and the length of the ridge portions 251, 252 in the up and down direction. In the same manner, the vertical wall height H1 is the height of the vertical walls 121, 122 in the direction substantially perpendicular to both the longitudinal direction of the structural member 100 and the direction in which the vertical walls 121, 122 of the first member 10 face each other. The height of the vertical walls 121, 122 is a length obtained by combining the length of the vertical walls 121, 122 itself in the up and down direction, the length of the ridge portions 141, 142 in the up and down direction, and the length of the ridge portions 151, 152 in the up and down direction. The ratio: H2/H1 of the vertical wall height H2 to the vertical wall height H1 is preferably more than 1/12, and more preferably 1/6 or more. Further, H2/H1 is preferably 1/2 or less, and more preferably 1/3 or less.

The flanges 231, 232 are disposed opposite to the top plate 21 with respect to the vertical walls 221, 222, and protrude outward relative to the vertical walls 221, 222. The flanges 231, 232 protrude outward in the width direction from the vertical walls 221, 222 facing each other. One flange 231 is made to overlap with the one flange 131 of the first member 10, and is joined to this flange 131. The other flange 232 is made to overlap with the other flange 132 of the first member 10, and is joined to this flange 132. The flanges 231, 232 of the second member 20 are joined to the flanges 131, 132 of the first member 10 by welding, for example. Alternatively, the flanges 231, 232 may be mechanically joined to the flanges 131, 132 by rivets or the like.

The flanges 231, 232 are connected to the end edges of the vertical walls 221, 222 opposite to the end edges of the vertical walls 221, 222 that are connected to each other by the top plate 21. The one flange 231 is connected to the one vertical wall 221 via the ridge portion 251. The other flange 232 is connected to the other vertical wall 222 via the ridge portion 252. That is, the vertical wall 221 and the flange 231 are connected by the ridge portion 251, and the vertical wall 222 and the flange 232 are connected by the ridge portion 252. The vertical wall 221 and the flange 231 may be formed as an integral body, or may be formed as separate bodies and then joined together by welding or the like. In the same manner, the vertical wall 222 and the flange 232 may be formed as an integral body, or may be formed as separate bodies and then joined together by welding or the like. Each of the ridge portions 251, 252 has a substantially arc shape as viewed in a transverse cross-sectional view of the structural member 100, for example.

The ridge portions 251, 252 are respectively disposed along the ridge portions 151, 152 of the first member 10. One ridge portion 251 is proximate to the one ridge portion 151 of the first member 10. The other ridge portion 252 is proximate to the other ridge portion 152 of the first member 10. It is preferable that the size of a gap formed between the ridge portion 151 of the first member 10 and the ridge portion 251 of the second member 20 and the size of a gap formed between the ridge portion 152 of the first member 10 and the ridge portion 252 of the second member 20 be approximately 2.0 mm at maximum. It is more preferable that the ridge portions 251, 252 be respectively in contact with the ridge portions 151, 152.

The second member 20 is made of a plate-like starting material. A material of the second member 20 is metal, such as steel or aluminum, for example. The second member 20 is typically formed by pressing a metal sheet. However, the material of the second member 20 is not limited to metal. For example, carbon fiber reinforced plastic (CFRP) or the like may be selected as a material of the second member 20. The material of the second member 20 may be the same as or different from the material of the first member 10. Further, the sheet thickness of the second member 20 may be the same as or different from the sheet thickness of the first member 10.

(Restricting Portion)

The structural member 100 further includes a restricting portion 30. The restricting portion 30 is provided between the vertical walls 221, 222 of the second member 20. When a crash load is applied to the structural member 100 from the direction of the top plate 21 of the second member 20, the restricting portion 30 restricts deformation in which the upper portions of the vertical walls 121, 122 of the first member 10 approach each other. The upper portions of the vertical walls 121, 122 refer to the portions of the vertical walls 121, 122 close to the flanges 131, 132. The portions of the vertical walls 121, 122 close to the flanges 131, 132 refer to the portions within a range of 1/3 of the vertical walls 121, 122 in the height direction of the structural member 100 from the side close to the flanges 131, 132, for example.

In the present embodiment, the restricting portion 30 is formed of a plurality of beads 31. As shown in FIG. 2, each bead 31 protrudes from the top plate 21 of the second member 20 in the direction opposite to the top plate 11 of the first member 10. Each bead 31 is provided between the vertical walls 221, 222 of the second member 20. Each bead 31 extends from one vertical wall 221 to the other vertical wall 222 to be connected to the vertical walls 221, 222.

As shown in FIG. 3, each of the plurality of beads 31 is provided between the vertical walls 221, 222 to extend substantially parallel to the width direction of the structural member 100. It is preferable that at least some of the plurality of beads 31 contiguously extend from the one vertical wall 221 to the other vertical wall 222 without interruption. It is more preferable that all of the plurality of beads 31 contiguously extend from the one vertical wall 221 to the other vertical wall 222 without interruption.

In the example of the present embodiment, the plurality of beads 31 are arranged at uniform intervals over the overall length of the second member 20. However, the plurality of beads 31 may be arranged in a non-uniform manner over the overall length of the second member 20. That is, the structural member 100 may have a portion in which the density of the beads 31 between the vertical walls 221, 222 is relatively high and a portion in which the density of the beads 31 between the vertical walls 221, 222 is relatively low.

Referring to FIG. 2 again, each bead 31 has a bead height H3. The bead height H3 is the maximum height of each bead 31 in the direction substantially perpendicular to both the longitudinal direction of the structural member 100 and the direction in which the vertical walls 121, 122 of the first member 10 face each other. More specifically, the bead height H3 is the distance in the height direction from the lower surface (the surface on the first member 10 side) of the top plate 21 of the second member 20 to the upper end of each bead 31. The bead height H3 of each bead 31 is smaller than the vertical wall height H2 of the second member 20.

It is preferable that the bead height H3 be 50% or less of the vertical wall height H2 (H3/H2≤0.50). The bead height H3 may be set to 18% or more of the vertical wall height H2, for example (H3/H2≥0.18).

As shown in FIG. 4, in the present embodiment, the plurality of beads 31 are integrally formed with the top plate 21 of the second member 20. That is, in the example of the present embodiment, the plurality of beads 31 are included in the second member 20. The second member 20 with the beads 31 is formed by pressing one metal sheet, for example.

Each bead 31 has a curved shape that protrudes in the direction opposite to the top plate 11 of the first member 10 as viewed in a longitudinal cross-sectional view of the structural member 100. Each bead 31 has a smooth shape substantially having no corner portion as viewed in a longitudinal cross-sectional view of the structural member 100. For the top plate 21, each portion between adjacent beads 31 forms a linear portion 211. Each linear portion 211 has a linear shape substantially parallel to the longitudinal direction as viewed in a longitudinal cross-sectional view of the structural member 100, for example.

It is preferable that, intervals (bead pitch) P between the adjacent beads 31 in the longitudinal direction of the structural member 100 be less than 45.0 mm. In the present embodiment, the bead pitch P is the distance between the apexes of the adjacent beads 31. The bead pitch P may be set to 15.0 mm or more, for example.

Assuming the length, in the longitudinal direction of the structural member 100, of an area in which each bead 31 is present (the area excluding the linear portions 211) as a bead width W, the ratio of the bead width W to the bead pitch P may be set to be more than 32%, for example (W/P>0.32). Further, the ratio of the bead width W to the bead pitch P may be set to be less than 97%, for example (W/P<0.97).

Advantageous Effect

The structural member 100 according to an embodiment has excellent withstand load performance against a crash load from the direction of the second member 20. In more detail, in the structural member 100 according to the present embodiment, the vertical walls 221, 222 of the second member 20 are disposed along the vertical walls 121, 122 of the first member 10 inside of the vertical walls 121, 122. Further, the plurality of beads 31 are provided between the vertical walls 221, 222 of the second member 20 as the restricting portion 30 that restricts deformation in which the vertical walls 121, 122 of the first member 10 tilt inward, so that the upper portions of the vertical walls 121, 122 approach each other. Each bead 31 extends from the one vertical wall 221 to the other vertical wall 222. When a crash load is input to the structural member 100 from the direction of the second member 20, so that the vertical walls 121, 122 of the first member 10 tend to tilt inward in the width direction, the vertical walls 221, 222 and the beads 31 can suppress tilting of the vertical walls 121, 122. As a result, at the time of a crash of the mobile body, which is an automobile, for example, a reduction in height of the structural member 100 in transverse cross section is suppressed, and the structural member 100 can receive a crash load at a stage in which the amount of intrusion into the structural member 100 is small. Further, it is possible to disperse a crash load in the longitudinal direction of the structural member 100 by the beads 31 and hence, plastic deformation of the structural member 100 is less likely to occur. Accordingly, it is possible to maintain the withstand load of the structural member 100 even when intrusion into the structural member 100 progresses. Accordingly, at the time of a crash, it is possible to prevent cross-sectional collapse of the structural member 100 from occurring before deformation of the crash box 200 is completed, for example.

In the present embodiment, the size of the gap G formed between the vertical wall 121 of the first member 10 and the vertical wall 221 of the second member 20 and the size of the gap G formed between the vertical wall 122 of the first member 10 and the vertical wall 222 of the second member 20 is preferably set to 2.0 mm or less. With such setting, the vertical walls 221, 222 of the second member 20 are respectively disposed sufficiently proximate to the vertical walls 121, 122 of the first member 10. Therefore, when a crash load is input to the structural member 100 from the direction of the second member 20, it is possible to more effectively suppress tilting of the vertical walls 121, 122 of the first member 10. Accordingly, it is possible to further increase withstand load performance of the structural member 100 against a crash load from the direction of the second member 20.

In the present embodiment, the ridge portions 251, 252 of the second member 20 close to the flanges 231, 232 are disposed along the ridge portions 151, 152 of the first member 10 close to the flanges 131, 132. With such a configuration, it is possible to reinforce the ridge portions 151, 152 of the first member 10 by the ridge portions 251, 252 of the second member 20. Therefore, when a crash load is input to the structural member 100 from the direction of the second member 20, it is possible to suppress occurrence of folding deformation in the ridge portions 151, 152 of the first member 10. Accordingly, it is possible to prevent withstand load performance of the structural member 100 from decreasing due to folding deformation of the ridge portions 151, 152.

In the present embodiment, the bead height H3 of each bead 31 is preferably 50% or less of the vertical wall height H2 of the second member 20. By setting the bead height H3 as described above, when a crash load is input to the structural member 100 from the direction of the second member 20, plastic deformation of the structural member 100 is even less likely to occur and hence, it is possible to maintain the withstand load of the structural member 100 for a longer period of time. Accordingly, it is possible to further increase withstand load performance of the structural member 100 against a crash load from the direction of the second member 20.

The height of each bead 31 may or may not be constant over the overall length of the bead 31 in the width direction of the structural member 100. For example, the height of the end portion of each bead 31 close to the vertical wall 221 and/or the vertical wall 222 may be set to be higher than the height of other portions. In this case, it is possible to suppress an increase in the weight of the structural member 100 and to increase withstand load performance of the structural member 100.

In the present embodiment, it is preferable that the bead pitch P be less than 45.0 mm. In this case, when a crash load is input to the structural member 100 from the direction of the second member 20, it is possible to effectively suppress plastic deformation of the structural member 100 and hence, it is possible to maintain the withstand load of the structural member 100 for a longer period of time. Accordingly, it is possible to further increase withstand load performance of the structural member 100 against a crash load from the direction of the second member 20.

In the present embodiment, it is preferable that at least some of the plurality of beads 31 contiguously extend from the one vertical wall 221 to the other vertical wall 222 of the second member 20. It is more preferable that all of the beads 31 contiguously extend from the one vertical wall 221 to the other vertical wall 222. When a crash load is input to the structural member 100 from the direction of the second member 20, the beads 31 having such a configuration can further surely suppress tilting of the vertical walls 121, 122 of the first member 10. Accordingly, it is possible to further increase withstand load performance of the structural member 100 against a crash load from the direction of the second member 20.

In the present embodiment, the plurality of beads 31 may be arranged at uniform intervals over the overall length of the second member 20. In this case, it is possible to suppress tilting of the vertical walls 121, 122 of the first member 10 irrespective of the longitudinal position of the portion of the structural member 100 to which a crash load is input. Accordingly, it is possible to cause the entire structural member 100 to exhibit high withstand load performance.

In the present embodiment, the plurality of beads 31 may be arranged in a non-uniform manner over the overall length of the second member 20. That is, over the overall length of the second member 20, there may be a portion in which the density of the beads 31 is relatively high and a portion in which the density of the beads 31 is relatively low. With such a configuration, when a crash load is input to the structural member 100 from the direction of the second member 20, it is possible to cause the portion having a small density of the beads 31 to deform prior to other portions. For example, in the case in which the structural member 100 has a portion that is intended to have reduced withstand load performance, the beads 31 are not disposed at such a portion, or the beads 31 are arranged at such a portion with a larger bead pitch P than other portions. With such a configuration, irrespective of the position to which a crash load is input, it is possible to always cause a portion of the structural member 100 at which the beads 31 are either not present or arranged with a large bead pitch P to deform.

In the present embodiment, the plurality of beads 31 are integrally formed with the top plate 21 of the second member 20. With such a configuration, it is possible to suppress an increase in the weight of the structural member 100 caused by the beads 31.

In the present embodiment, each bead 31 has a curved shape that protrudes in the direction opposite to the top plate 11 of the first member 10 as viewed in a longitudinal cross-sectional view of the structural member 100. With such a configuration, in the case of pressing a metal sheet, for example, to form the second member 20 in which the beads 31 are integrally formed with the top plate 21, it is possible to suppress the rate of reduction in the sheet thickness of the bead 31.

Second Embodiment

Figure 5:
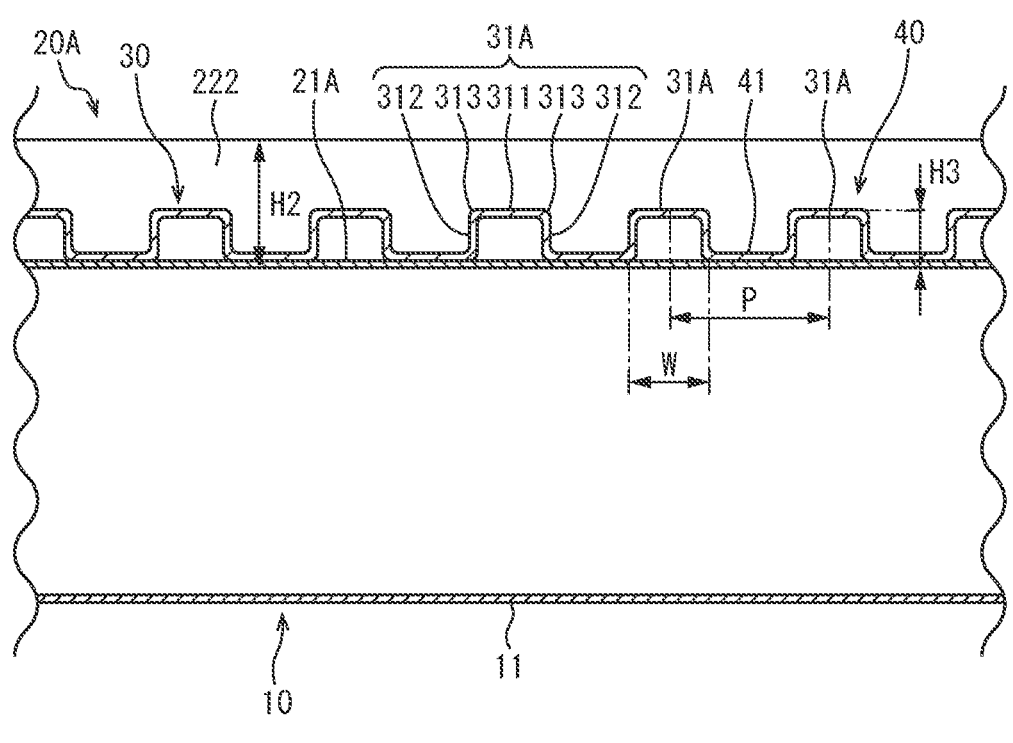
FIG. 5 is a partial longitudinal cross-sectional view of a structural member according to a second embodiment.

FIG. 5 is a partial longitudinal cross-sectional view of a structural member 100A according to a second embodiment. The structural member 100A has a configuration substantially the same as the configuration of the structural member 100 according to the first embodiment. However, the structural member 100A differs from the structural member 100 according to the first embodiment in that beads 31A are formed separately from a top plate 21A of a second member 20A.

As shown in FIG. 5, in the present embodiment, the plurality of beads 31A are included in a member 40 that is formed separately from the top plate 21A of the second member 20A. Of both surfaces of the top plate 21A of the second member 20A, the member 40 is disposed on the surface opposite to the top plate 11 of the first member 10. The member 40 is fixed to the top plate 21A by welding, mechanical joining, or the like, for example. The member 40 includes linear portions 41 each of which is disposed between adjacent beads 31A.

The linear portions 41 are in contact with the top plate 21A of the second member 20A. Each bead 31A protrudes from the linear portion 41 in the direction opposite to the top plate 11 of the first member 10. In the example shown in FIG. 5, each bead 31A includes corner portions 313 each of which is formed by linear-shaped portions 311, 312 disposed adjacent as viewed in a longitudinal cross-sectional view of the structural member 100. For example, each bead 31A has a substantially rectangular shape as viewed in a longitudinal cross-sectional view of the structural member 100A. For the beads 31A, the bead height H3, the bead pitch P, and the ratio: W/P of the bead width W to the bead pitch P may be set to be substantially the same as those in the first embodiment.

The member 40 including the beads 31A is made of a plate-like starting material. A material of the member 40 is metal, such as steel or aluminum, for example. The member 40 is typically formed by pressing a metal sheet. However, the material of the member 40 is not limited to metal. For example, carbon fiber reinforced plastic (CFRP) or the like may be selected as a material of the member 40. A material of the member 40 may be the same as or different from a material of the first member 10 or the second member 20A. Further, the sheet thickness of the member 40 may be the same as or different from the sheet thickness of the first member 10 or the second member 20A.

In the present embodiment, the plurality of beads 31A are included in the member 40 that is formed separately from the second member 20A. With such a configuration, the shape of the top plate 21A is simplified compared with the case in which the beads 31A are integrally formed with the top plate 21 of the second member 20 as in the case of the first embodiment (FIG. 4). Therefore, in the case in which the second member 20A is formed by pressing, for example, it is possible to form the second member 20A more easily. However, the configuration in which the top plate 21 of the second member 20 is integrally formed with the beads 31A as in the case of the first embodiment is advantageous in terms of a reduction in weight of the structural member.

In the present embodiment, each bead 31A includes the plurality of corner portions 313 each of which is formed by the linear-shaped portions 311, 312. By causing each bead 31A to include the corner portions 313, it is possible to more surely receive a crash load input to the structural member 100A from the direction of the second member 20A. That is, due to the presence of the corner portions 313 in each bead 31A, a crash load input to the structural member 100A disperses mainly through the corner portions 313 and hence, it is possible to further increase withstand load performance of the structural member 100A. Further, when the shape of each bead 31A is set to a polygonal shape, such as a rectangular shape, for example, as viewed in a longitudinal cross section of the structural member 100A, the linear length of the member 40 increases and hence, it is possible to receive a crash load with a large longitudinal cross-sectional area.

The embodiments according to the present disclosure have been described heretofore. However, the present disclosure is not limited to the above-mentioned embodiments, and various modifications are conceivable without departing from the gist of the present disclosure.

In the above-mentioned respective embodiments, any of various shapes may be selected as the shape of the beads 31, 31A. For example, in the first embodiment, as viewed in a longitudinal cross-sectional view of the structural member 100, each bead 31 has a curved shape that protrudes in the direction opposite to the top plate 11 of the first member 10, and each linear portion 211 is provided between the adjacent beads 31. However, the beads 31 having a substantially sine wave shape, for example, as viewed in a longitudinal cross-sectional view of the structural member 100 may be formed on the top plate 21 of the second member 20. In this case, the linear portion 211 is not present between the adjacent beads 31.

Further, in the second embodiment, each bead 31A has a substantially rectangular shape, for example, as viewed in a longitudinal cross-sectional view of the structural member 100A. However, each bead 31A may be formed to have a polygonal shape other than a rectangular shape as viewed in a longitudinal cross-sectional view of the structural member 100A. Alternatively, in the structural member 100A according to the second embodiment, the shape of the beads 31A may be changed to the shape of the respective beads 31 in the first embodiment. That is, in the structural member 100A, the member 40 may include the beads 31 having a curved shape in place of the beads 31A. In the same manner, in the structural member 100 according to the first embodiment, the shape of the beads 31 may be changed to the shape of the respective beads 31A in the second embodiment. That is, in the structural member 100, the beads 31A each including the corner portions 313 may be integrally formed with the top plate 21 of the second member 20 in place of the beads 31.

Figure 6:
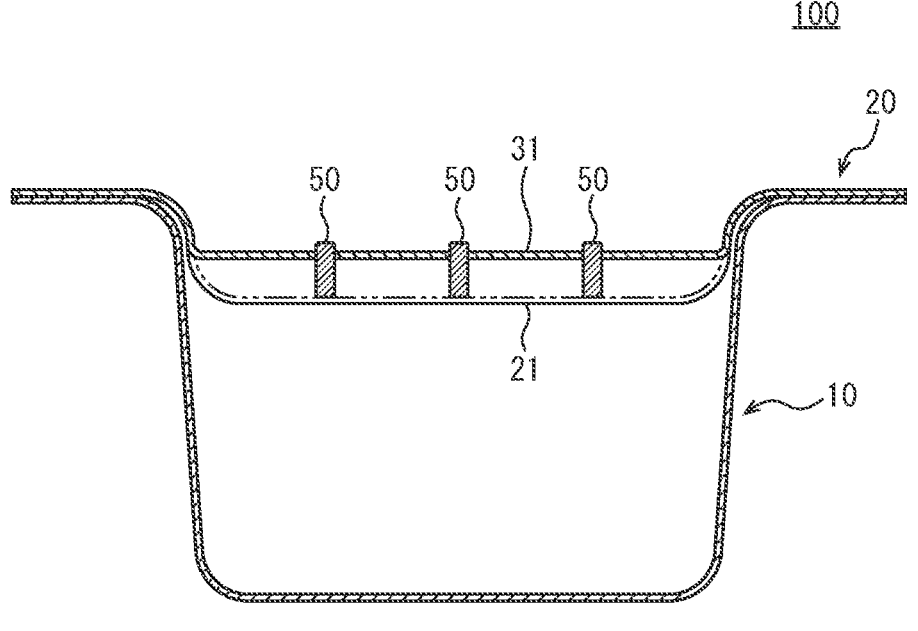
FIG. 6 is a transverse cross-sectional view of a structural member according to a modification of the first embodiment.

In the above-mentioned first embodiment, it is preferable that some or all of the beads 31 contiguously extend from the one vertical wall 221 to the other vertical wall 222 of the second member 20. However, each bead 31 may be divided by at least one rib 50 as shown in FIG. 6, for example. The ribs 50 are fixed to the top plate 21 of the second member 20, and extend in the longitudinal direction of the structural member 100. In this case, it is preferable that each rib 50 be solid. In the same manner, also in the structural member 100A according to the above-mentioned second embodiment, each bead 31A extending between the vertical walls 221, 222 may be divided by the ribs 50.

Figure 7:
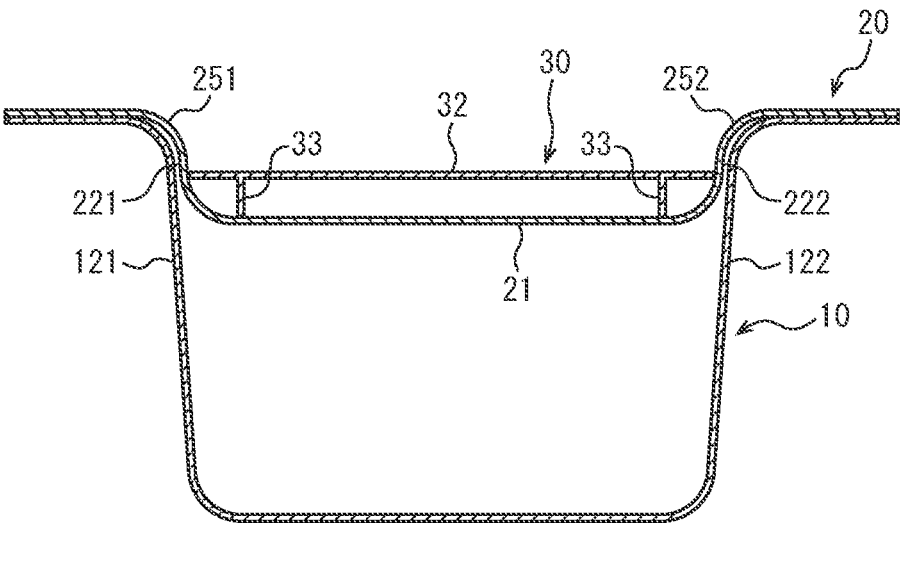
FIG. 7 is a transverse cross-sectional view of a structural member according to modifications of the respective embodiments.

In the above-mentioned respective embodiments, the restricting portion 30 is formed of the plurality of beads 31 or the plurality of beads 31A. However, it is not always necessary for the restricting portion 30 to be formed of a plurality of beads. As shown in FIG. 7, for example, the restricting portion 30 may be a member 32 disposed between the vertical walls 221, 222 of the second member 20. The member 32 serving as the restricting portion 30 is disposed between the vertical walls 221, 222 in a state of being spaced apart from the top plate 21, for example. The member 32 may be fixed to the top plate 21 via girder portions 33 disposed between the member 32 and the top plate 21. Alternatively, the member 32 may be fixed to the vertical walls 221, 222 of the second member 20. The member 32 may have a flat plate shape or a corrugated shape, for example. The member 32 may have a ladder shape, a lattice shape, or the like as viewed in a plan view of the structural member. In the same manner as the beads 31, 31A, the member 32 may also be integrally formed with the second member 20, or may be included in a member that is formed separately from the second member 20. It is preferable that the member 32 be disposed at a position close to the ridge portions 251, 252 in the height direction of the structural member in a state of being proximate to or in contact with the vertical walls 221, 222 of the second member 20. However, it is preferable that the member 32 be disposed not to overlap with the ridge portions 251, 252.

EXAMPLES

Hereinafter, the present disclosure will be described in more detail with reference to examples. However, the present disclosure is not limited to the following examples.

First Example

To confirm advantageous effects of the structural member for an automobile according to the present disclosure, a simulation of a three-point bending test was performed on the structural members 100 having the configurations shown in FIG. 2 to FIG. 4 by using commercially available structure analysis software (LS-DYNA, manufactured by ANSYS). The starting material and the dimensions of the respective components of the structural member 100 in the present simulation are as follows.

Figure 8:
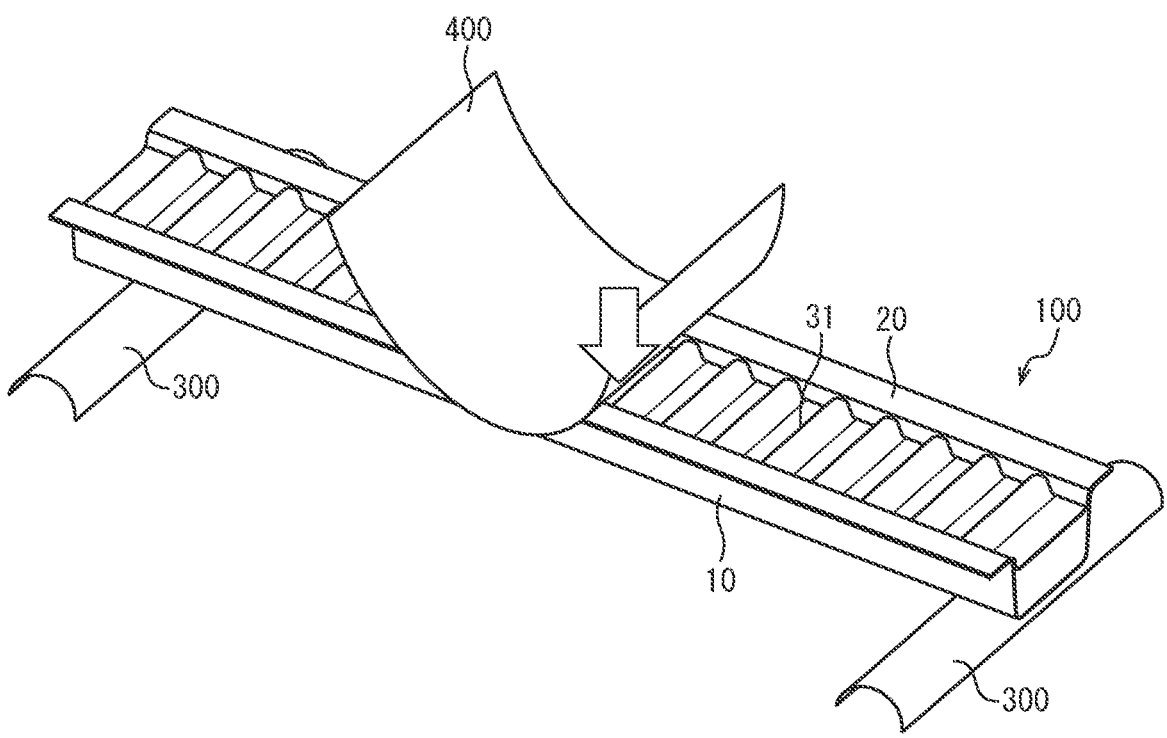
FIG. 8 is a schematic view for describing basic conditions of a simulation of a three-point bending test in a first example.

Starting material of first member 10: steel sheet having tensile strength of 1470 MPa and sheet thickness of 1.6 mm Vertical wall height H1 of first member 10: 60 mm Width W1 of first member 10: 80 mm Starting material of second member 20: steel sheet having tensile strength of 1470 MPa and sheet thickness of 1.6 mm Vertical wall height H2 of second member 20: 16 mm Bead height H3: 6.0 mm Bead width W: 14.5 mm Bead pitch P: 22.5 mm FIG. 8 is a schematic view for describing basic conditions of the simulation of the three-point bending test. As shown in FIG. 8, in the present simulation, the structural member 100, with the second member 20 and the beads 31 facing upward, was supported by two fulcrums 300, and an impactor 400 was pushed from above against the center portion of the structural member 100 in the longitudinal direction. The distance between the fulcrums 300 was set to 700 mm, the radius of curvature of each fulcrum 300 was set to 30 mm, the radius of curvature of the impactor 400 was set to 127 mm, and the crash speed of the impactor 400 was set to 22.5 km/h.

Figure 9:
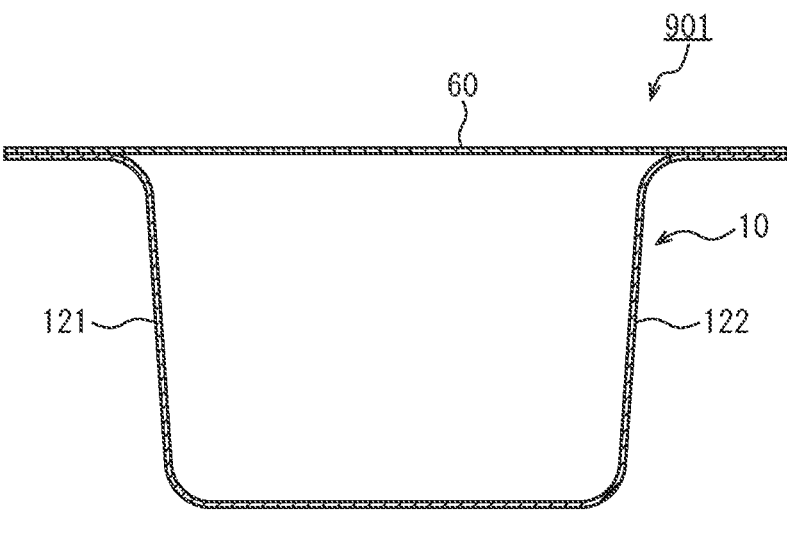
FIG. 9 is a transverse cross-sectional view of a structural member according to Comparative Example 1.
Figure 10:
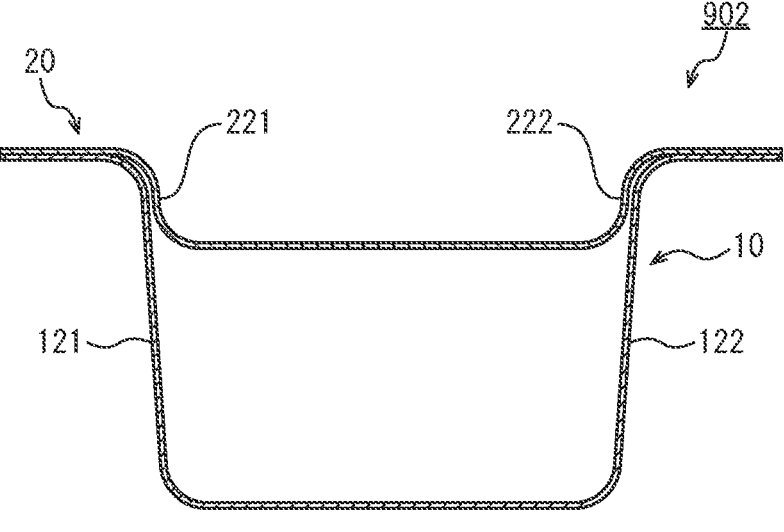
FIG. 10 is a transverse cross-sectional view of a structural member according to Comparative Example 2.

For the comparison, a simulation of a three-point bending test substantially the same as that performed on the structural member 100 was performed also on structural members having configurations different from the configuration of the structural member 100. FIG. 9 is a transverse cross-sectional view of a structural member 901 according to Comparative Example 1, and FIG. 10 is a transverse cross-sectional view of a structural member 902 according to Comparative Example 2.

As shown in FIG. 9, the structural member 901 according to Comparative Example 1 includes a first member 10 similar to the structural member 100, but a second member 60 is a flat metal sheet in the structural member 901. Unlike the second member 20 of the structural member 100, the second member 60 of the structural member 901 does not include a pair of vertical walls extending along the vertical walls 121, 122 of the first member 10. As shown in FIG. 10, the structural member 902 according to Comparative Example 2 includes a first member 10 and a second member 20 similar to the structural member 100, but beads serving as the restricting portion are not provided between the vertical walls 221, 222 of the second member 20 in the structural member 902.

Figure 11:
FIG. 11 shows load-displacement curves obtained by performing the simulation of the three-point bending test in the first example.
Figure 11:
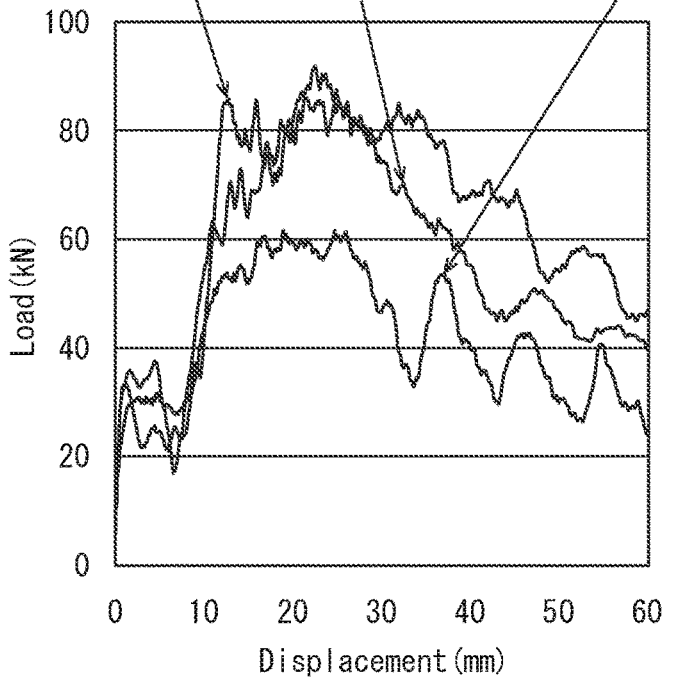

FIG. 11 shows load-displacement curves obtained by performing the simulation of the three-point bending test on the structural member 100 according to the example and on the structural members 901, 902 according to Comparative Examples 1, 2. As shown in FIG. 11, in the example, a high load is obtained at a stage in which displacement of the impactor 400 (the amount of intrusion) is smaller compared with Comparative Examples 1, 2. That is, when a crash load is input from the direction of the second member 20, the structural member 100 according to the example can receive a load larger than a load received by the structural member 901 according to Comparative Example 1 and the structural member 902 according to Comparative Example 2 at an initial stage of a crash.

Further, as can be understood from FIG. 11, in the example, a load reaches the maximum value when displacement of the impactor 400 is approximately 25 mm, and a high load is maintained thereafter for a while. In contrast, in Comparative Example 2, although a load reaches the maximum value when displacement of the impactor 400 is approximately 25 mm in the same manner as the example, unlike the example, the load decreases immediately thereafter. This shows that plastic deformation was also suppressed after the load reached the maximum load in the structural member 100 according to the example, whereas plastic deformation occurred immediately after the load reached the maximum load in the structural member 902 according to Comparative Example 2. That is, in the structural member 100 according to the example, it is possible to cause plastic deformation to be less likely to occur even when the amount of intrusion increases and hence, it is possible to maintain a withstand load.

Second Example

Figure 12:
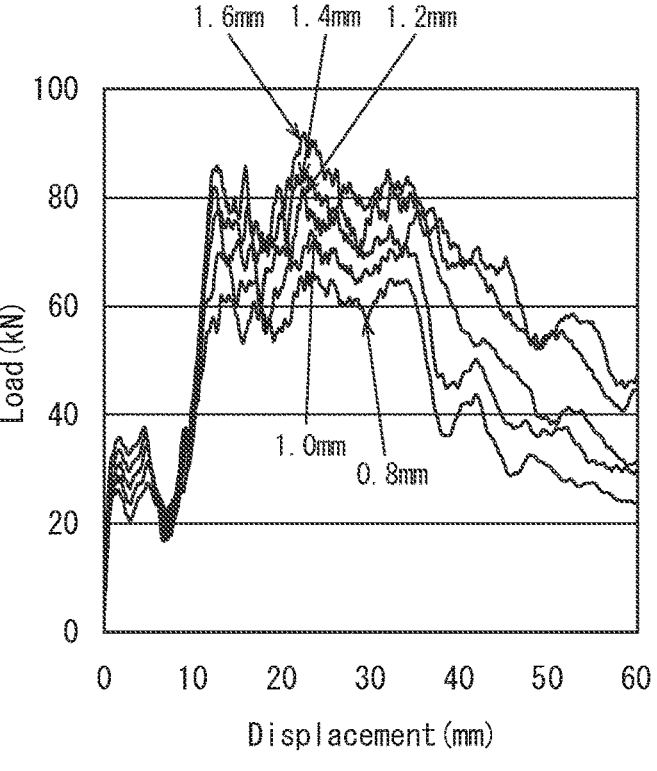
FIG. 12 shows load-displacement curves obtained by performing a simulation of a three-point bending test in a second example.

A simulation of a three-point bending test substantially the same as the above-mentioned simulation was performed on each of the structural members 100, 901, 902 used in the first example by changing the sheet thickness of the second member 20 or the second member 60. FIG. 12 shows load-displacement curves obtained by performing the simulation of the three-point bending test in the example, FIG. 13 shows load-displacement curves obtained by performing the simulation of the three-point bending test in Comparative Example 1, and FIG. 14 shows load-displacement curves obtained by performing the simulation of the three-point bending test in Comparative Example 2.

Figure 13:
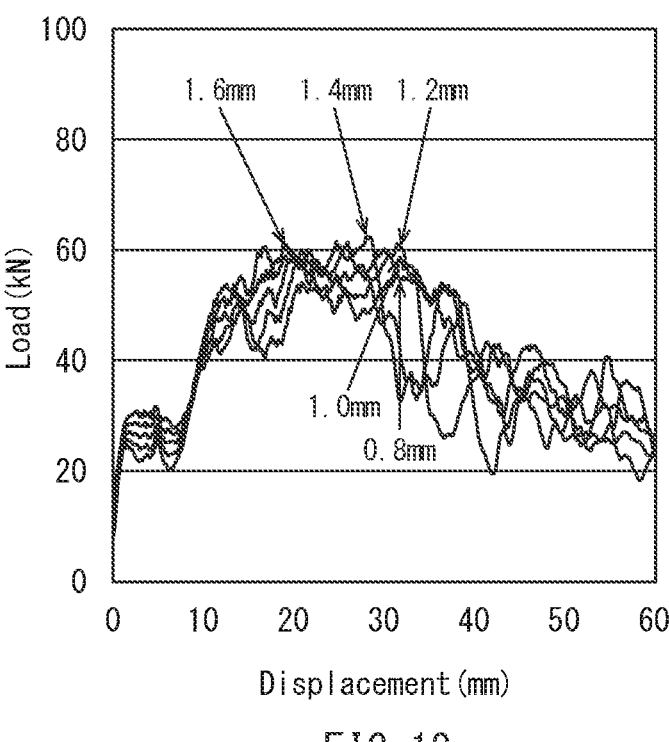
FIG. 13 shows other load-displacement curves obtained by performing the simulation of the three-point bending test in the second example.
Figure 14:
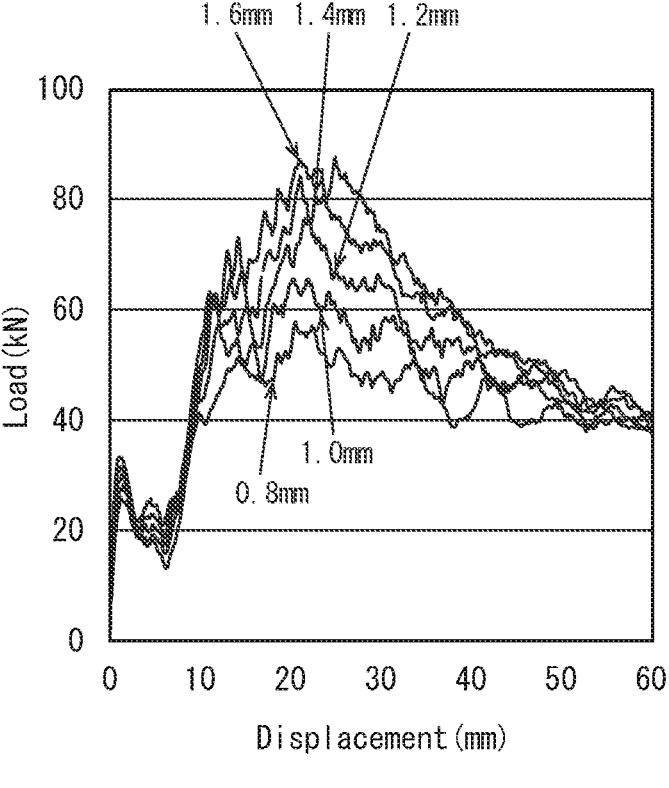
FIG. 14 shows even other load-displacement curves obtained by performing the simulation of the three-point bending test in the second example.

When Comparative Example 1 shown in FIG. 13 was compared with Comparative Example 2 shown in FIG. 14, loads in Comparative Example 2 were overall larger than those in Comparative Example 1. When the example shown in FIG. 12 was compared with Comparative Example 2 shown in FIG. 14, in the example, loads even larger than the loads in Comparative Example 2 were obtained. For example, in the example, the maximum loads when sheet thickness of the second member 20 is 0.8 mm, 1.0 mm, 1.2 mm, and 1.4 mm are substantially equivalent to the maximum loads when the sheet thickness of the second member 20 is 1.0 mm, 1.2 mm, 1.4 mm, and 1.6 mm in Comparative Example 2. Accordingly, it can be said that, when the maximum loads that the structural members can bear at the time of a crash from the direction of the second member 20 are set to the same level, the weight of the structural member 100 according to the example is lower than the weight of the structural member 902 according to Comparative Example 2.

Third Example

A simulation of a three-point bending test substantially the same as that in the first example was performed on structural members 100 by changing the bead height H3 from 3.0 mm to 14.0 mm. The starting material and the dimensions of the respective components of each structural member 100 other than the bead height H3 are substantially the same as those in the first example. However, the sheet thickness of the second member 20 was set to 1.2 mm.

Figure 15:
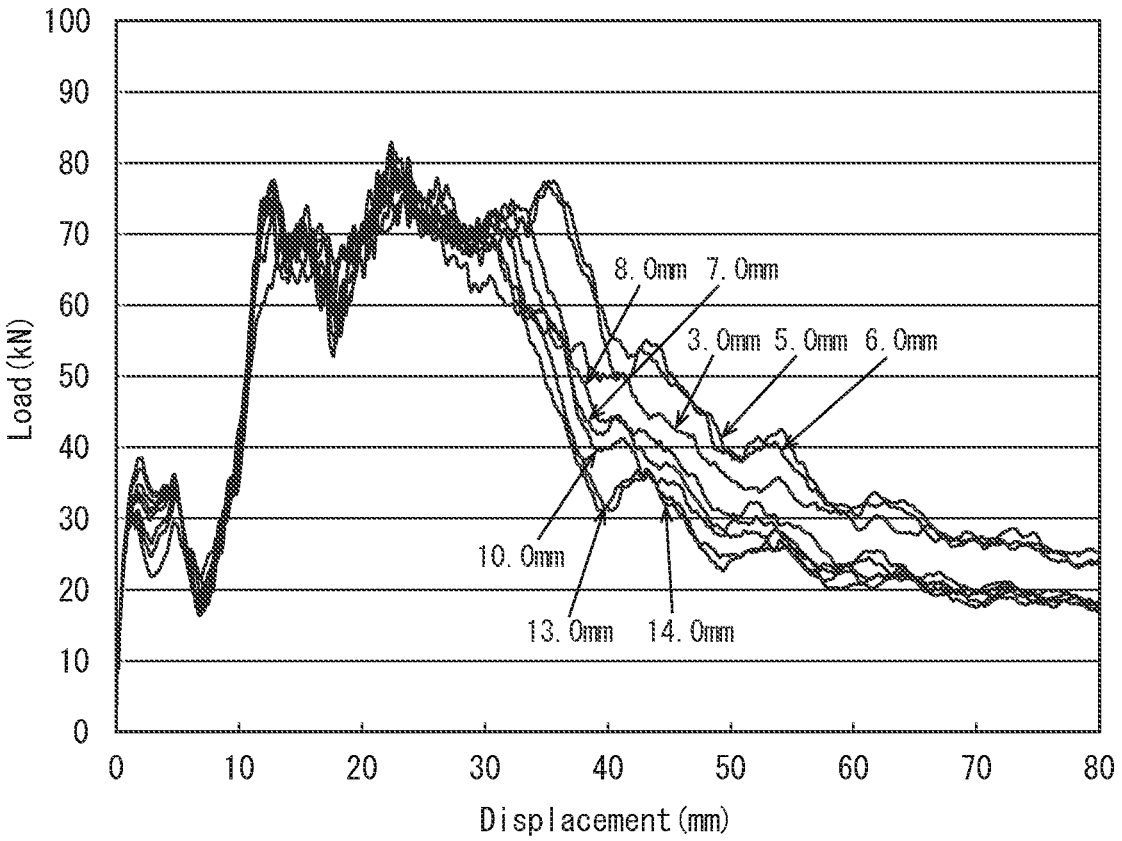
FIG. 15 shows load-displacement curves obtained by performing a simulation of a three-point bending test in a third example.

FIG. 15 shows load-displacement curves obtained by performing the simulation of the three-point bending test in the present example. As shown in FIG. 15, in the case in which the bead height H3 was 3.0 mm to 8.0 mm, high loads were maintained for a longer period of time compared with the case in which the bead height H3 of the beads 31 was more than 8.0 mm. From such a result, in the structural member 100 used in the present example, it is preferable that the bead height H3 be 8.0 mm or less. When the bead height H3 of 8.0 mm in the present example is converted to the ratio of the bead height H3 of 8.0 mm to the vertical wall height H2 of the second member 20 of 16.0 mm, the ratio is 50% and hence, it can be said that the bead height H3 is preferably 50% or less of the vertical wall height H2 of the second member 20. Further, when the lower limit value of the bead height H3 of 3.0 mm in the present example is converted to the ratio of the lower limit value of the bead height H3 of 3.0 mm to the vertical wall height H2 of the second member 20 of 16.0 mm, the ratio is more than 18%. Accordingly, it is preferable that the bead height H3 of the beads 31 be more than 18% of the vertical wall height H2 of the second member 20.

Fourth Example

A simulation of a three-point bending test substantially the same as that in the first example was performed on structural members 100 by changing the bead pitch P from 15.0 mm to 50.0 mm. The starting material and the dimensions of the respective components of each structural member 100 other than the bead pitch P are substantially the same as those in the first example. However, the sheet thickness of the second member 20 was set to 1.2 mm in the same manner as the third example.

Figure 16:
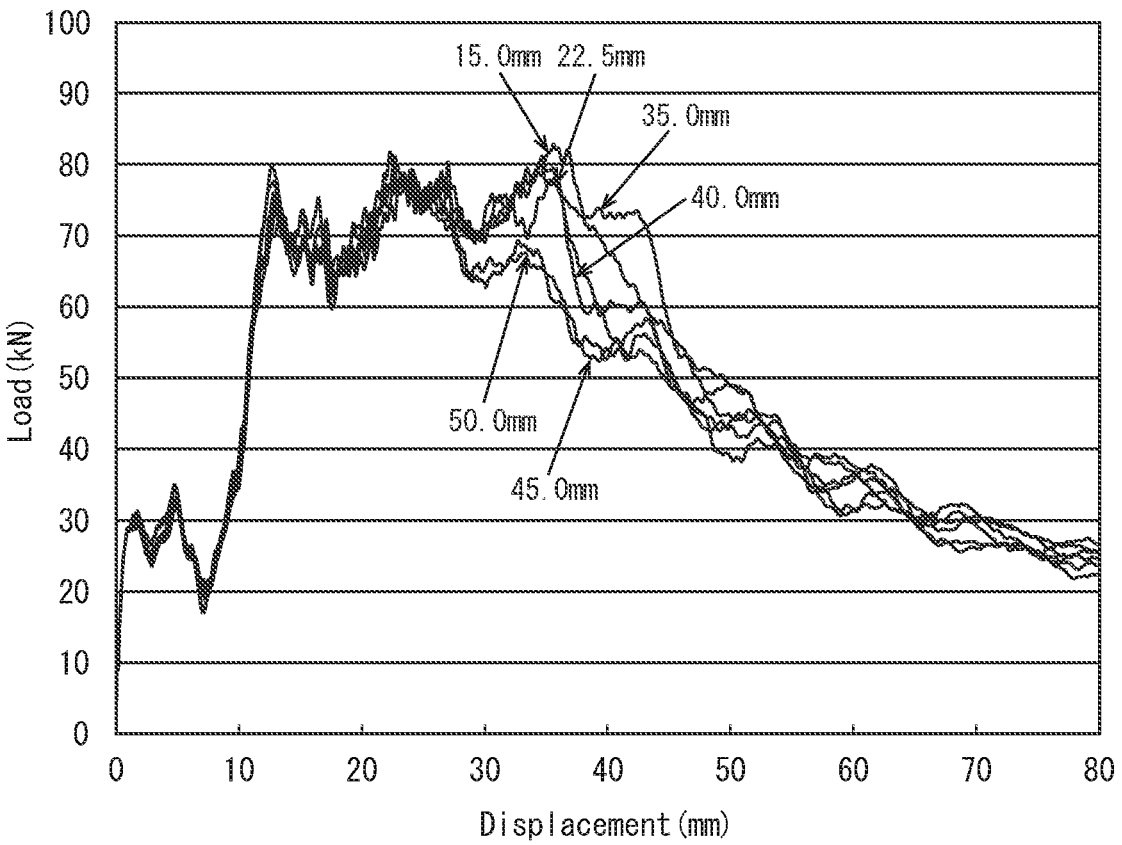
FIG. 16 shows load-displacement curves obtained by performing a simulation of a three-point bending test in a fourth example.

FIG. 16 shows load-displacement curves obtained by performing the simulation of the three-point bending test in the present example. As shown in FIG. 16, in the case in which the bead pitch P was 15.0 mm to 40.0 mm, high loads were maintained for a longer period of time compared with the case in which the bead pitch P of the beads 31 was 45.0 mm or more. From such a result, in the structural member 100 used in the present example, it is preferable that the bead pitch P be less than 45.0 mm. In the structural member 100 used in the present example, it is also preferable that the bead pitch P be 15.0 mm or more.

In the present example, the ratio of the bead width W of 14.5 mm to the bead pitch P of 45.0 mm is more than 32%. In contrast, the ratio of the bead width W of 14.5 mm to the bead pitch P of 15.0 mm is less than 97%. Accordingly, it can be said that the ratio of the bead width W to the bead pitch P is preferably more than 32% and preferably less than 97%.

Fifth Example

A simulation of a three-point bending test substantially the same as that in the first example was performed on structural members 100 by changing the size of a gap G formed between the vertical wall 121 of the first member 10 and the vertical wall 221 of the second member 20 and the size of a gap G formed between the vertical wall 122 of the first member 10 and the vertical wall 222 of the second member 20 from 0 mm to 5.0 mm. The starting material and the dimensions of the respective components of each structural member 100 other than the gap G are substantially the same as those in the first example. However, the sheet thickness of the second member 20 was set to 1.2 mm.

Figure 17:
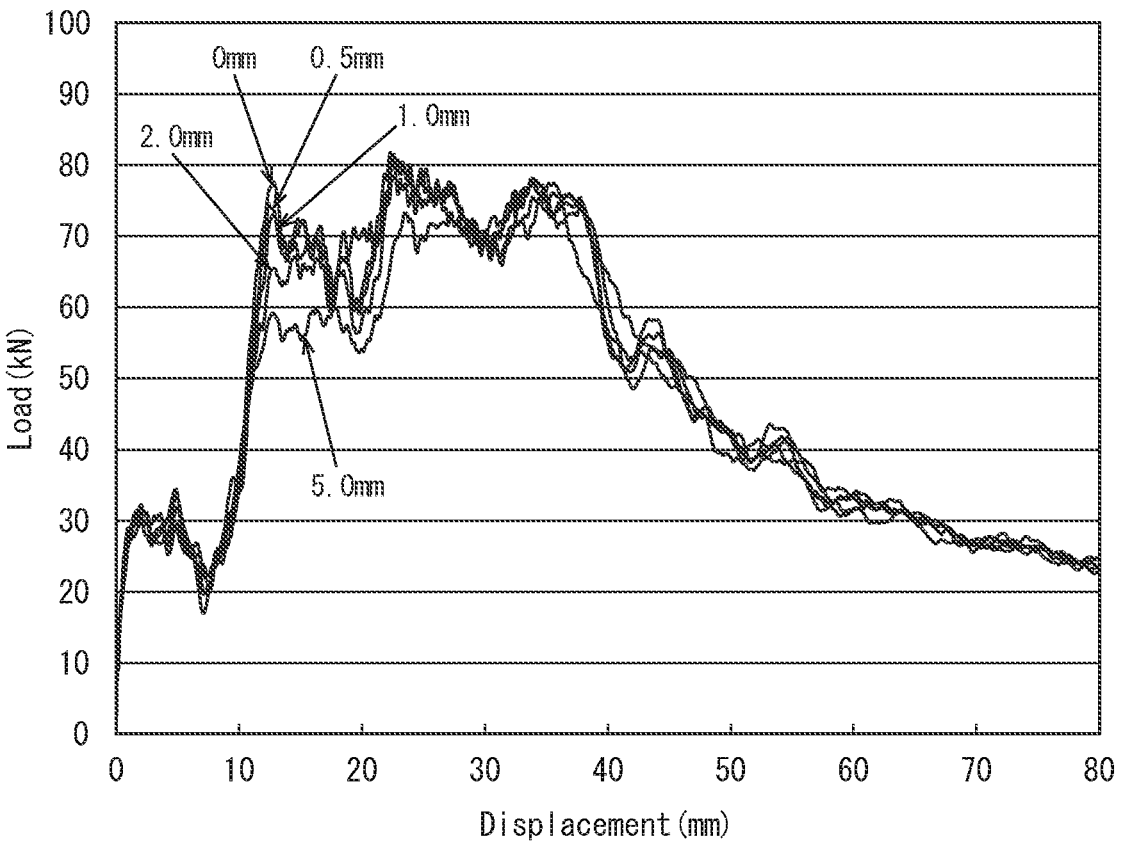
FIG. 17 shows load-displacement curves obtained by performing a simulation of a three-point bending test in a fifth example.

FIG. 17 shows load-displacement curves obtained by performing the simulation of the three-point bending test in the present example. As shown in FIG. 17, in the case in which the size of the gap G was 0 mm to 2.0 mm, high loads were obtained at a stage in which displacement of the impactor 400 (the amount of intrusion) was relatively small. However, in the case in which the size of the gap G was 5.0 mm, the rise of a high load came later compared with the case in which the size of the gap G was 0 mm to 2.0 mm. Accordingly, it is preferable that the size of the gap G formed between the vertical wall 121 of the first member 10 and the vertical wall 221 of the second member 20 and the size of the gap G formed between the vertical wall 122 of the first member 10 and the vertical wall 222 of the second member 20 be 2.0 mm or less.

REFERENCE SIGNS LIST

100, 100A: structural member
10: first member
11: top plate (first top plate)
121, 122: vertical wall (first vertical wall)
131, 132: flange (first flange)
151, 152: ridge portion (first ridge portion)
20, 20A: second member
21, 21A: top plate (second top plate)
221, 222: vertical wall (second vertical wall)
231, 232: flange (second flange)
251, 252: ridge portion (second ridge portion)
30: restricting portion
31, 31A: bead
313: corner portion

The invention claimed is:

1. A structural member for a mobile body having an elongated shape, the structural member comprising:

a first member including a first top plate, a pair of first vertical walls, a pair of first flanges, and a pair of first ridge portions, and extending in a longitudinal direction of the structural member, the first vertical walls being disposed to face each other, end edges of the first vertical walls being connected to each other by the first top plate, the first flanges being disposed opposite to the first top plate with respect to the first vertical walls and protruding outward relative to the first vertical walls, the first ridge portions connecting the first vertical walls and the first flanges;

a second member including a second top plate, a pair of second vertical walls, a pair of second flanges, and a pair of second ridge portions, and extending in the longitudinal direction of the structural member, the second top plate being disposed inside of the first vertical walls and facing the first top plate with a space between the second top plate and the first top plate, the second vertical walls being disposed along the first vertical walls inside of the first vertical walls, end edges of the second vertical walls being connected to each other by the second top plate, the second flanges being disposed opposite to the second top plate with respect to the second vertical walls, protruding outward relative to the second vertical walls, and being joined to the first flanges, the second ridge portions connecting the second vertical walls and the second flanges; and a restricting portion provided between the second vertical walls, and configured to restrict deformation in which portions of the first vertical walls close to the first flanges approach each other, wherein the restricting portion is formed of a plurality of beads each of which protrudes from the second top plate in a direction opposite to the first top plate, and each of which extends from one second vertical wall to the other second vertical wall to be connected to the second vertical walls.

2. The structural member according to claim 1, wherein a size of a gap formed between one of the first vertical walls and one of the second vertical walls, and a size of a gap formed between an other of the first vertical walls and an other of the second vertical walls are 2.0 mm or less.

3. The structural member according to claim 1, wherein in a direction perpendicular to both the longitudinal direction and a direction in which the first vertical walls face each other, a height of each of the plurality of beads is 50% or less of a height of the second vertical walls.

4. The structural member according to claim 1, wherein among the plurality of beads, an interval between adjacent beads in the longitudinal direction is less than 45.0 mm.

5. The structural member according to claim 1, wherein at least some of the plurality of beads contiguously extend from the one second vertical wall to the other second vertical wall.

6. The structural member according to claim 5, wherein all of the plurality of beads contiguously extend from the one second vertical wall to the other second vertical wall.

7. The structural member according to claim 1, wherein the plurality of beads are arranged at a uniform interval over an overall length of the second member.

8. The structural member according to claim 1, wherein the plurality of beads are arranged in a non-uniform manner over the overall length of the second member.

9. The structural member according to claim 1, wherein each of the plurality of beads has a curved shape that protrudes in a direction opposite to the first top plate as viewed in a longitudinal cross-sectional view of the structural member.

10. The structural member according to claim 1, wherein each of the plurality of beads includes a corner portion formed by linear-shaped portions disposed adjacent as viewed in a longitudinal cross-sectional view of the structural member.

11. The structural member according to claim 1, wherein the restricting portion is integrally formed with the second member.

12. The structural member according to claim 1, wherein the restricting portion is included in a member that is formed separately from the second member.

* * * * *